United States Patent [19]

McGill

[11] Patent Number: 5,114,476
[45] Date of Patent: May 19, 1992

[54] CHRISTMAS TREE FIRE-RETARDANT COMPOSITIONS

[76] Inventor: J. E. McGill, 14661 Frenchtown Rd., Brownsville, Calif. 95919

[21] Appl. No.: 646,404

[22] Filed: Jan. 28, 1991

[51] Int. Cl.$^5$ ............................................... C09D 5/18
[52] U.S. Cl. .............................. 106/18.12; 106/15.05; 106/18.14
[58] Field of Search .................... 106/15.05, 16, 18.12, 106/18.14

[56] References Cited

U.S. PATENT DOCUMENTS 2,526,083 10/1950 Nielsen .............................. 106/18.12
4,612,050 9/1986 Hicks ................................. 106/18.12

Primary Examiner—William R. Dixon, Jr.
Assistant Examiner—Anthony J. Greene
Attorney, Agent, or Firm—Mark C. Jacobs

[57] ABSTRACT

A fire-retardant composition for Christmas trees and related items which significantly lessens needle drop and inhibits tree burning for at least 30 days. The composition meets the current law and regulations of the State of California for Flame-Retardant Chemicals, Fabrics Application Concerns.

The composition comprises an intimate mixture of sodium silicate, a corn syrup, water, a wetting agent containing formation and a calcium halide in varying proportions.

7 Claims, No Drawings

CHRISTMAS TREE FIRE-RETARDANT COMPOSITIONS

BACKGROUND OF THE INVENTION

One of the greatest risks to households during the month of December is the possibility of fire due to the combustion of the holiday Christmas tree. We have all learned about soaking the tree in water; using special stands; checking the wiring of the lights; using low voltage wiring and many other precautions. Still fires during the holidays are something we all read about. Indeed recent statistics from the California State Fire Marshall indicate that for the Christmas season of 1988-89 that there were 75 reported Christmas tree fires of which 47 took place in December.

One of the reasons that so many of these fires take place is the fact that the Christmas trees and holiday wreaths simply dry out, and become subject to spontaneous combustion. There is a need therefore for a composition that can be easily applied to Christmas trees and boughs to retard fire.

It is an object therefore of this invention to provide a fire-retardant composition that can be readily applied to Christmas trees and boughs, and wreaths.

It is another object to provide a fire-retardant composition for Christmas trees and the like that can be sprayed on the tree with very little effort.

Still another object is to provide a fire retardant for Christmas trees which is low in cost to produce.

Yet another object is to provide a Christmas tree fire retardant that is long lasting, for at least about 30 days.

These and other objects of the invention will in part be obvious and will in part appear hereinafter.

The invention accordingly comprises the product possessing the features, properties and the relation of components which are exemplified in the following detailed disclosure and the scope of the application of which will be indicated in the claims.

For a fuller understanding of the nature and objects of the invention reference should be made to the following detailed description.

SUMMARY OF THE INVENTION

A fire retardant for Christmas trees that can be sprayed or otherwise applied Christmas trees, boughs, and wreaths to significantly lessen needle drop and inhibit burning for up to at least 30 days. The composition meets the current law and regulations of the State of California for "Flame-Retardant Chemicals, Fabrics Application Concerns".

The composition comprises an intimate mixture of sodium silicate, a corn syrup, water, a wetting agent containing formulation such as a liquid laundry detergent and calcium halide in varying proportions.

DESCRIPTION OF THE PREFERRED EMBODIMENT

The California Health and Safety Code, and Title 19 of the Cal Administrative Code,—Public Safety, form the foundation for the California Flame Retardant Chemicals, Fabrics Application Concerns. Section 1264.3 of this manual recites the test procedure for confirmation of fire-resistance for Christmas trees after they have had anti-fire chemical compositions applied to them. The details of this test procedure will be discussed below.

The composition of this invention which may be applied as by spraying, dipping or any other suitable conventional mode of application is equally applicable to trees, including Douglas fir, spruce, pine and other evergreens as well as to boughs from limbs of such trees and to wreaths made from pieces of such trees.

The composition comprises an intimate mixture of (A) an alkali metal silicate, preferably sodium silicate; (B) corn syrup; (C) water; (D) a wetting agent containing formulation; and (E) a calcium halide.

As to ingredient (A), sodium silicate, water glass, is cheap and readily available though potassium silicate is also believed to be operative.

The corn syrup utilized may be either a light or dark flowable corn syrup. I utilized Karo brand, light—in color corn syrup with excellent results.

The water employed as a separately added ingredient, may be ordinary tap water. Distilled water or deionized water is not a requirement. The pH should be preferably in the range of 6.5 to 7.5. The amount employed does not take into consideration any water that may already be present as part of the formulation of any liquid ingredient.

As to the (D) ingredient, mention may be made of liquid laundry detergents which include one or both of ionic and nonionic detergents and perhaps a separate wetting agent, as well as wetting agents per se. I have utilized liquid laundry detergents sold under the trademarks Liquid Tide TM and Liquid All TM ; liquid shampoo sold under the trademark Prell ®, as well as a wetting agent sold under the trademark Earth Pack TM among others.

The last ingredient is a calcium halide. Although calcium chloride is the most readily available of the calcium halide, any of calcium bromide and calcium iodide display the same water of crystallization property and as such are suitable for this invention.

The ingredients of this inventive composition may be present in the following ranges based on volume:

| (A) | Alkali Metal Silicate | 28-65% |
| --- | --- | --- |
| (B) | Corn Syrup | 6-28% |
| (C) | Water | 10-45% |
| (D) | Wetting agent containing formulation | .01% to 1% |
| (E) | Calcium halide | .01% to 1% |

The following examples are to be considered as exemplary and not as limiting.

EXAMPLE 1

Within the above ranges, I have found that a preferred composition contains the following, by volume:

| Sodium silicate | 48% |
| --- | --- |
| Light Corn syrup | 11% |
| Tap water | 40.5% |
| Liquid Landry soap- Tide | .04% |
| Calcium halide | .25% |

In devising the ranges for the several ingredients of the fire-retardants of this invention, I have found that if sodium silicate is present in excess of about 60-65% the composition is too viscous and as such can not be applied from a nonaerosol squeeze bottle. I have also found that excess calcium chloride causes the sodium silicate to gel, thus rendering the composition unusable.

EXAMPLE 2

Into a 5 gallon vat, I placed 10.4 oz. light corn syrup, 1.6 oz of 35% calcium chloride, 2.5 oz. liquid soap, to this I added 258.5 oz. tap water after thoroughly blending and with blender still running I added 307 gms. type O Sodium Silicate and continued blending until thoroughly mixed.

EXAMPLE 3

All of the ingredients, and the volumes thereof of the first example were maintained but for the substitution of Liquid All TM for Liquid Tide TM.

EXAMPLE 4

The procedure of Example 2 was followed except that I used only 1.5 oz. of Earth Pack TM and added 1 oz. sodium silicate. The end result seems to be the same. Both mixes are excellent fire retardants.

EXAMPLE 5

In the preparation of this formulation I employed dark corn syrup instead of light syrup. I found that although the mix produced an excellent retardant the color was too dark and is therefore considered unsuitable for a Christmas tree retardant commercial product, even though it was operable.

MODE OF PREPARATION

The composition of this invention is prepared in two parts and then mixed together. In a first vat of about 5 gallons capacity, one intimately mixes the water, calcium chloride and the wetting agent containing formulation such as the liquid laundry soap. Light or dark corn syrup is then blended in continuously.

One places the required amount of sodium silicate into a second 5 gallon vat and then while mixing adds the blended contents of the first vat.

Blending can be carried out from about 32 degrees to about 150 degrees or even higher. However since heat is not needed, an operating temperature of 68 to 80 degrees will give satisfactory results.

On the other hand, when compounds such as boric acid and borax were substituted for the sodium silicate, unacceptable results occurred.

Blending may be achieved by using any high speed shearing device such as mixers made by Hobart among others.

MODE OF APPLICATION

The composition of this invention is intended for application to Christmas trees, limbs, boughs, in the home. First spread some newspapers on the floor or out on the patio. Stand the tree upright in its stand, or lay the boughs on the paper. Then apply the composition from a conventional nonaerosol squeeze spray bottle over the upper surface of all of the limbs of the tree, or on the upper surface of the bough. Then spray the entire undersurface of the tree. Or, if doing boughs, turn them over and spray the second side.

Allow the sprayed item to thoroughly dry. In a 72 degree room this should take about 45 minutes. Outside in a cold climate, drying might require an overnight period.

Of course a pump spray, or aerosol can also be used for the application of the composition to the substrate. One can readily inspect to determine the areas that have been covered, as the needles will glisten slightly.

CALIFORNIA FIRE RETARDANCY TEST PROCEDURE

The procedure to determine the acceptability of any chemical composition as an approved California fire retardant for Christmas trees reads as follows according to Section 1264.3 of the above referred to regulations:

"The chemical shall be applied to fresh green branches of Douglas fir, approximately three feet long. The fire resistance test shall be performed at the completion of [the] a thirty day aging period, and shall be conducted as nearly as practical as described in Section 1237.1. (See below) Tests shall be made on several different areas of the treated branch.

There shall be no spread of flames from the area in contact with the test flame, and any after flaming shall not exceed ten seconds. At the completion of the 30-day aging period, the treated branch shall not lose its needles more readily nor shall they have turned to brown to a greater extent than those of the untreated branch similarly aged".

After first describing the nature of the bunsen burner to be used and the nature of the work environment for the test, Section 1237.1 discusses how the test should be carried. That portion of the regulation reads as follows:

"The specimens shall be suspended with their lower end three-quarters inch above the top of a three-eighths inch I.E. Bunsen or Tirril gas burner, with the air supply completely shut off, and adjusted to give a luminous flame one and one-half inches long. The flame shall be applied vertically at the center of the width of the lower end of the specimens to twelve seconds, then withdrawn, and the duration of flaming in the specimens after withdrawal of the burner noted. After complete extinction of all flame and glow in the specimen, the length of char shall be measured, as specified in Federal Specifications CCC-T-191a, Supplement October 1945."

Compositions of the instant invention were applied to 12 Douglas fir branches, then after having been hung to dry for 30 days as is required, they were checked for retardancy in accordance with the test method recited above by one of the state of California approved testing laboratories; namely, Warnock Hersey International, Inc. of Pittsburgh, Calif.

In the testing procedure, the samples are suspended from a steel rail, and a bunsen burner with a 1.5 inch flame is placed underneath for about 12 seconds, and then the burner is removed. With 11 of the samples there was zero spread of the flame. In one, the flame spread slightly but self extinguished.

It is seen that the compositions of this invention are the first ones to meet the new stringent fire retardancy requirements of the State of California. It is believed that the fire retardancy requirement for Christmas trees and the like, for most other states is less restrictive than is the one for California. The compositions of this invention significantly lessen needle drop and inhibit tree burning for at least 30 days.

Therefore it is anticipated that use of the compositions of this invention will lead to a lessening of the fire danger during the holiday season.

While the term laundry soap has been employed herein, the term is used to define a detergent, which is a composition containing at least one wetting agent.

Since certain changes may be made in the above compositions without departing from the scope of the invention herein involved, it is intended that all matter contained in the above description and shown shall be interpreted as illustrative and not in a limiting sense.

I claim:

1. A fire-retardant composition for application to Christmas trees, boughs or wreaths comprising by volume:

|  |  |
|---|---|
| (A) Alkali metal silicate | 28–65% |
| (B) Corn syrup | 6–28% |
| (C) Water | 10–45% |
| (D) Wetting agent | .01–1% |
| (E) Calcium halide | .01–1%. |

2. The composition of claim 1 wherein the wetting agent is selected from liquid laundry detergents.

3. A fire-retardant composition for application to Christmas trees, boughs or wreaths comprising by volume:

|  |  |
|---|---|
| (A) Sodium silicate | 48% |
| (B) Corn syrup | 11% |
| (C) Water | 40.5% |
| (D) Wetting agent | .04% |
| (E) Calcum halide | .025%. |

4. The composition of claim 3 wherein the wetting agent is selected from liquid laundry detergents.

5. A process for retarding the flammability of Christmas trees, boughs or wreaths which comprises the steps of formulating a fire-retarding composition comprising by volume:

|  |  |
|---|---|
| (A) Alkali metal silicate | 28–65% |
| (B) Corn syrup | 6–28% |
| (C) Water | 10–45% |
| (D) Wetting agent | .01–1% |
| (E) Calcium halide | .01–1% | and applying said composition to the Christmas trees, boughs or wreaths.

6. The process of claim 5 wherein the composition is sprayed on and allowed to dry.

7. The process of claim 5 wherein the wetting agent is selected from liquid laundry detergents.

* * * * *